(12) United States Patent
Ahlberg

(10) Patent No.: US 7,182,406 B2
(45) Date of Patent: Feb. 27, 2007

(54) HYDRAULIC TIPPING ARRANGEMENT FOR A TRUCK

(75) Inventor: Jörgen Ahlberg, Växjö (SE)

(73) Assignee: Volvo Construction Equipment AB, Braas (SE)

( * ) Notice: Subject to any disclaimer, the term of this patent is extended or adjusted under 35 U.S.C. 154(b) by 0 days.

(21) Appl. No.: 10/707,251

(22) Filed: Dec. 1, 2003

(65) Prior Publication Data

US 2005/0017568 A1    Jan. 27, 2005

Related U.S. Application Data

(63) Continuation of application No. PCT/SE02/00982, filed on May 22, 2002, now abandoned.

(30) Foreign Application Priority Data

Jun. 1, 2001    (SE) .................................... 0101944

(51) Int. Cl.
*B60P 1/16* (2006.01)
(52) U.S. Cl. ................. 298/19 B; 298/22 P

(58) Field of Classification Search .............. 298/19 B, 298/22 P, 22 R; 254/89 H, 98 R, 93 VA, 254/423

See application file for complete search history.

(56) References Cited

U.S. PATENT DOCUMENTS

| 2,326,594 | A | * | 8/1943 | Wood ........................ 298/22 P |
| 2,449,202 | A | * | 9/1948 | Day ........................ 298/22 P |
| 2,476,694 | A | | 7/1949 | Bourne-Vanneck |
| 2,794,673 | A | | 6/1957 | Harbers et al. |
| 2,963,185 | A | * | 12/1960 | Jones et al. |
| 4,488,756 | A | | 12/1984 | Dalman .................... 298/19 B |

FOREIGN PATENT DOCUMENTS

FR    2.645088 A1 * 10/1990

* cited by examiner

*Primary Examiner*—Stephen Gordon
(74) *Attorney, Agent, or Firm*—Novak Druce & Quigg, LLP

(57) ABSTRACT

A hydraulic arrangement for operating a load body (11) on a heavy vehicle. The load body is connected to the frame (12) of the vehicle by way of at least one articulated joint (13), enabling the load body to tip between a lowered transport position and a raised tipping position. An hydraulic cylinder assembly (14) forming part of the hydraulic arrangement includes at least two piston cylinders (15–17), each working in its own direction, and which are hydraulically and mechanically coupled to one another.

10 Claims, 3 Drawing Sheets

HYDRAULIC TIPPING ARRANGEMENT FOR A TRUCK

CROSS REFERENCE TO RELATED APPLICATIONS

The present application is a continuation patent application of International Application No. PCT/SE02/00982 filed 22 May 2002 now abandoned which was published in English pursuant to Article 21(2) of the Patent Cooperation Treaty, and which claims priority to Swedish Application No. 0101944-7 filed 1 Jun. 2001. Both applications are expressly incorporated herein by reference in their entireties.

BACKGROUND OF INVENTION

1. Technical Field

The present invention relates to an hydraulic arrangement for operating a load body on a heavy vehicle in which the load body is connected to the frame of the vehicle by way of at least one articulated joint that enables the load body to tip, and to be moved between a lowered transport position and a raised tipping position.

2. Background

A heavy vehicle such as a dumper truck that, for instance, carries gravel in a load body typically discharges its load by tipping the load body. The load body, which is supported at the rear end of the vehicle, can usually be tipped to a maximum of 60° to 70°. Tipping is performed either by a directly acting lifting cylinder or indirectly via a knuckle joint arrangement that entails a system of linkages coupled to the load body and vehicle frame, and which is actuated by lifting cylinders.

There are many requirements to be taken into account when designing a tipping system. The system should, for example, be efficient; that is to say, it should rapidly tip the load and rapidly return to the home or transport position. It is advantageous to be able to use "small" hydraulic cylinders that have a short stroke and moderate hydraulic pressure, since this means that the hydraulic system can be of a more simple design and does not need to function with large flows of hydraulic fluid.

Some of the requirements, however, conflict with one another. A short stroke, for example, requires the production of large forces, and in turn, big cylinders. In such a configuration, the tipping geometry has great significance in the interplay of resulting forces.

If a point of action used for a tipping cylinder between the vehicle frame and the load body is applied essentially at the greatest distance from the load body bearing points on the frame, the force required of the piston cylinder is relatively low, but the piston cylinder then needs to be long. Use is therefore often made of telescopic cylinders that extend in a number of stages. This again becomes a slow process since the cylinder's large diameter is also offset by large oil flows per unit of time. A telescopic cylinder is moreover mechanically sensitive or vulnerable, since it has large sealing surfaces with increased risk of leakage.

Another example of cylinder mounting is to place single cylinders on either side of the load body; that is to say, with points of action shifted towards the load body bearing point on the vehicle frame. Since this shortens the lever arm, the power required from the tipping cylinders is increased.

U.S. Pat. No. 4,488,756 describes a tipping system having a master cylinder and two secondary cylinders that act in different directions. The master cylinder is fitted at the front edge of the load body and the two secondary cylinders are fitted with their point of action between the two ends of the load body. The master cylinder is intended to act during a first phase of the tipping in which the power requirement is greatest. This solution requires the hydraulic system to become relatively complex.

SUMMARY OF INVENTION

An object of the present invention is to provide a cost-effective and reliable hydraulic arrangement that is capable of rapidly performing an up-and-down tipping movement.

To achieve this object, an hydraulic arrangement configured according to the invention includes an hydraulic cylinder assembly, which comprises (includes, but is not limited to) at least two piston cylinders, each of which works in its own direction and which are hydraulically and mechanically coupled to one another. By means of this design, it is made possible to optimize the pressure area in two or more stages during a tipping cycle so that the hydraulic system is simple and hydraulically efficient, thereby reducing the cycle time for a tipping movement.

According to an advantageous variation of the invention, piston cylinders of the hydraulic cylinder assembly are arranged parallel and work in opposite directions. This design provides a compact and mechanically solid unit.

According to yet another advantageous embodiment (variation) of the invention, the hydraulic cylinder assembly comprises three piston cylinders, of which two work in the same direction and the third piston cylinder is located in the same plane between the two piston cylinders. This provides a unit that can easily be assembled and disassembled.

The pistons of both of the outer piston cylinders are suitably connected directly to the vehicle frame and the piston of the middle piston cylinder is suitably connected to the load body.

Further advantageous embodiments of the invention will become clear to those persons skilled in these arts in view of the following description.

BRIEF DESCRIPTION OF DRAWINGS

The invention will be described in more detail below with reference to exemplary embodiments as shown in the accompanying drawings of which.

DETAILED DESCRIPTION

Figure 1:
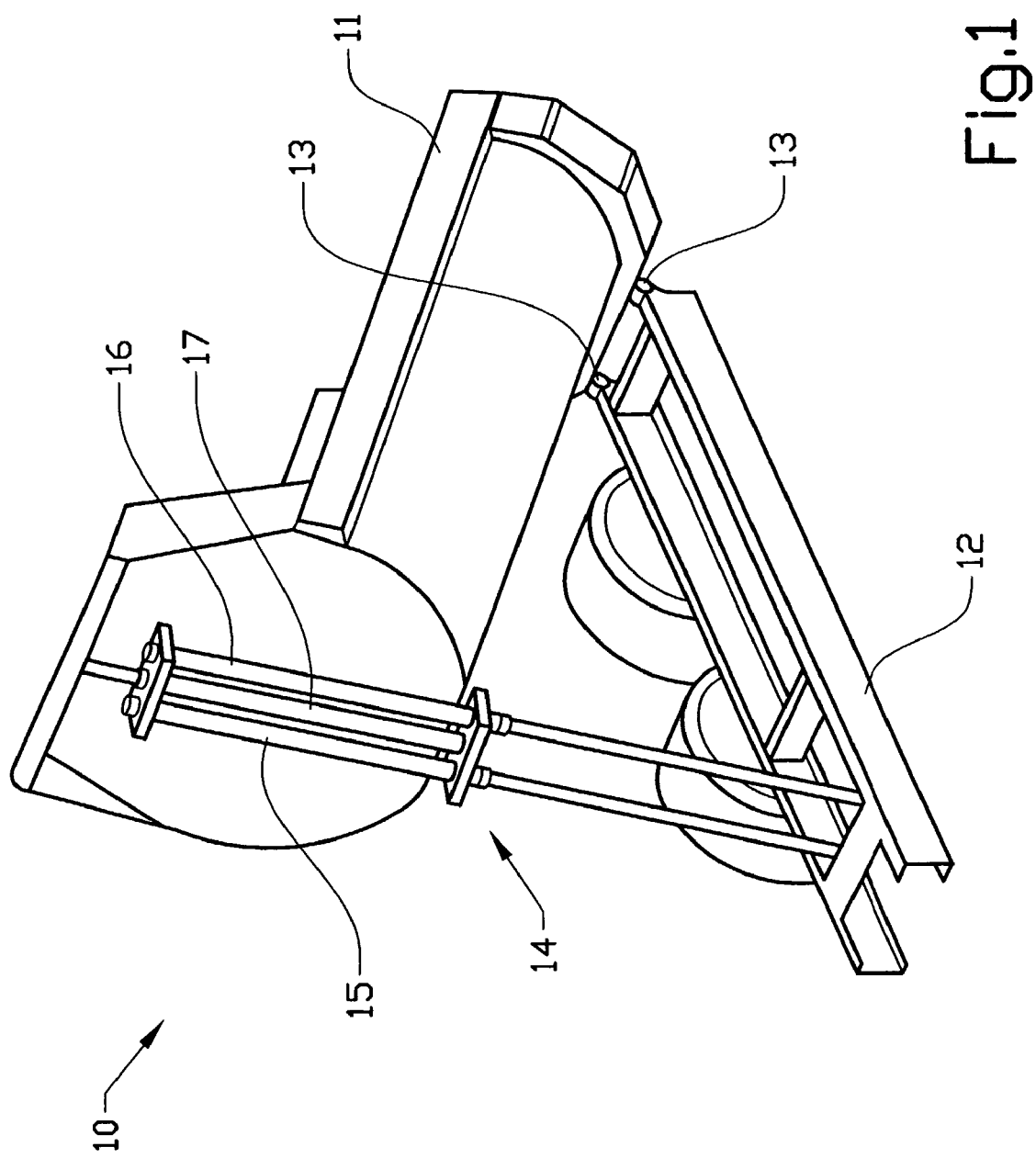
FIG. 1 is a perspective view showing a rear part of a heavy vehicle having an hydraulic arrangement configured according to the teachings of the presently disclosed invention.

A heavy vehicle 10, as exemplarily shown in FIG. 1, is provided with a load body 11 that is connected to a frame 12 of the vehicle by articulated joints 13 that enable the load body 11 to tip. FIG. 1 shows the load body 11 in an intermediate position between a lowered, transport position and a fully raised, tipping position. Operation between these positions is performed by means of an hydraulic arrangement comprising an hydraulic cylinder assembly 14, arranged at the front end of the load body, and an hydraulic system.

In the exemplary embodiment, the hydraulic cylinder assembly 14 comprises two outer parallel primary piston cylinders 15, 16 and a secondary piston cylinder 17 located between these cylinders and oriented in the same plane therewith. All of the piston cylinders are hydraulically and mechanically coupled to one another; the piston cylinders 15, 16 working in the same direction and the piston cylinder 17 working in the opposite direction. It is naturally possible to use more or fewer piston cylinders in such an hydraulic cylinder assembly.

Figure 2:
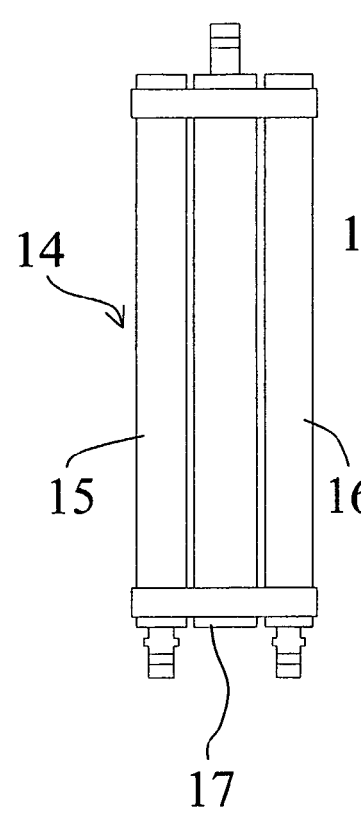
FIGS. 2–4 are a series of side views showing the hydraulic arrangement of FIG. 1 in three different working positions (contracted, partially extended, fully extended)
Figure 3:
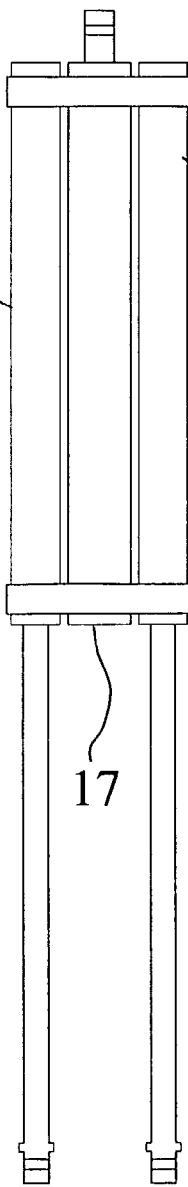
Figure 4:
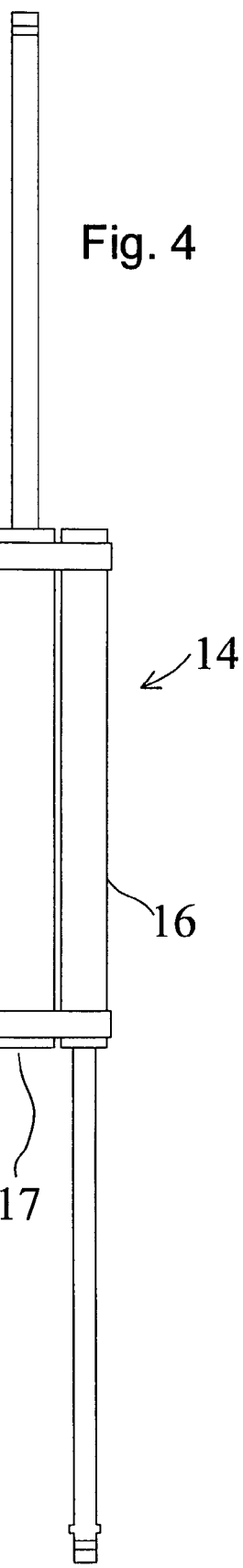

FIGS. 2 to 4 show the hydraulic cylinder assembly 14 in three different operative positions. FIG. 2 shows the primary piston cylinders 15, 16 and the secondary piston cylinder 17 in a retracted (contracted) position. FIG. 3 shows the primary piston cylinders in the extended position corresponding to FIG. 1. FIG. 4 shows both primary piston cylinders 15, 16 and secondary piston cylinder 17 in extended positions.

Figure 5:
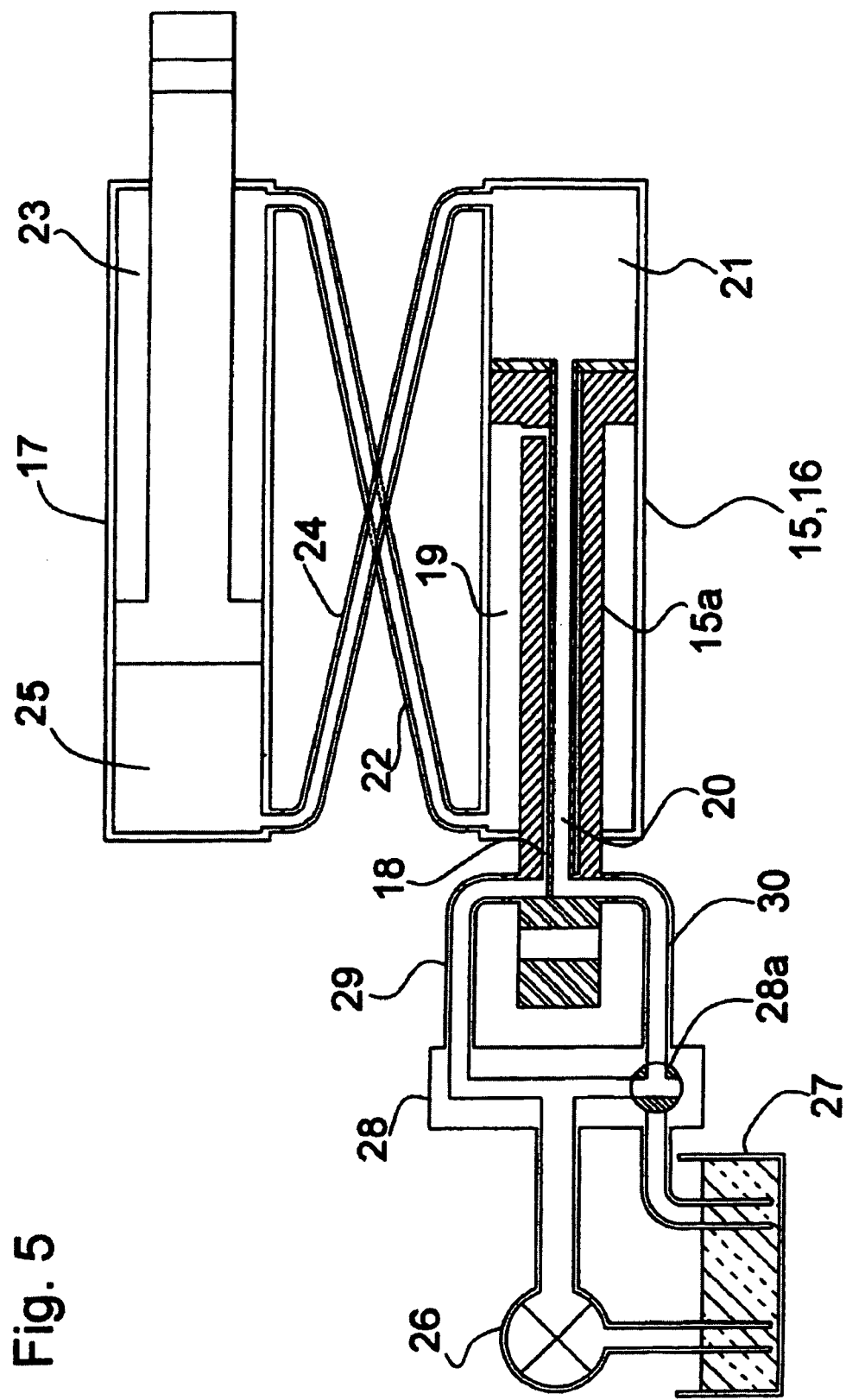
FIG. 5 is a schematic diagram illustrating exemplary operation of an hydraulic arrangement configured according to the teachings of the present invention.

FIG. 5 provides a schematic diagram of an hydraulic system utilizable for the operation of the hydraulic cylinder assembly 14. The system is simplified in that it only shows the one primary piston cylinder 15, which is provided with a piston rod 15a having a first internal passage 18 into a compression chamber 19 of the piston cylinder. A second internal passage 20 into the expansion chamber 21 of the piston cylinder is also provided. The secondary piston cylinder 17 is coupled in parallel with the primary piston cylinder 15 in such a way that the compression chamber 19 of the primary piston cylinder 15 is connected by way of a fluid line 22 to the compression chamber 23 of the secondary piston cylinder. The expansion chamber 21 of the primary piston cylinder 15 is connected byway of a fluid line 24 to the expansion chamber 25 of the secondary piston cylinder.

An hydraulic pump 26 is designed to draw hydraulic fluid from a tank 27 and to deliver the pressurized fluid to a valve unit 28. On expansion of the piston cylinders, a two-way valve 28a forming part of the valve unit 28 (as shown in FIG. 5) stops; the piston cylinders thereby being simultaneously pressurized on the expansion side and the compression side by way of the branch lines 29, 30. Since the piston area is greater on the expansion side than on the compression side, the piston rods will be pushed out. On compression of the piston cylinders, the two-way valve 28a of the valve unit 28 is switched over so that the branch line 30 is connected to the tank 27 so that the pressure on the expansion side of the pistons becomes zero. The excess pressure is maintained on the compression side of the pistons which causes the piston rods to be drawn in. In this way a tipping operation can be performed rapidly and efficiently.

If the hydraulic cylinder assembly comprises two primary cylinders and one secondary cylinder, the area of the secondary cylinder can be adjusted so as to limit maximum hydraulic pressure required for the tipping movement. For example, the two primary piston cylinders may function within a tipping angle range from 0° to approximately 30°. The force (expressed as a % of the load) will then have fallen from approximately 47% to approximately 33% of the weight of the load body (which means that the requisite oil pressure has been reduced from 100% to 70%).

The secondary piston cylinder 17 may be connected to the load body by way of a U-link, either with or without a piston cylinder enabling the U-link to be swung away from the load body, as is described, for example, in SE 307898.

It should be appreciated that the invention is not confined to the exemplary embodiments described above and shown in the drawings: a number of further variants and modifications being feasible without departing from the scope of the claims. For example, the heavy vehicle may consist of a trailer that can be connected to a traction vehicle.

The invention claimed is:

1. An hydraulic arrangement for operating a load body on a truck, the load body being connected to a frame of the truck by way of at least one articulated joint that enables tipping of the load body between a lowered transport position and a raised tipping position, said hydraulic arrangement comprising: a unitary hydraulic cylinder assembly having at least two parallel, and in opposite direction working piston cylinders that are hydraulically and mechanically coupled to one another.

2. The hydraulic arrangement as recited in claim 1, wherein the hydraulic cylinder assembly further comprises three piston cylinders in a common plane including two primary piston cylinders working in the same direction and a secondary piston cylinder located between said two primary piston cylinders.

3. The hydraulic arrangement as recited in claim 2, wherein piston rods of the two primary piston cylinders are configured to be directly connectable to the truck frame and a piston rod of the secondary piston cylinder is configured to be directly connectable to the load body.

4. The hydraulic arrangement as recited in claim 2, wherein a piston rod of the secondary piston cylinder is configured to be directly connectable to the load body by a mounting.

5. The hydraulic arrangement as recited in claim 1, wherein each of the piston cylinders of the hydraulic cylinder assembly are coupled in parallel with one another.

6. The hydraulic arrangement as recited in claim 3, wherein each of the piston rods of the primary piston cylinders is provided with a first internal passage to a compression chamber in the respective piston cylinder and a second internal passage to an expansion chamber in the respective piston cylinder.

7. A truck having an hydraulic arrangement for handling a load body located on the truck, the load body being connected to a frame of the truck by way of at least one articulated joint that enables tipping of the load body between a lowered transport position and a raised tipping position, said hydraulic arrangement comprising: a unitary hydraulic cylinder assembly having at least two parallel, and in opposite direction working piston cylinders that are hydraulically and mechanically coupled to one another.

8. The hydraulic arrangement as recited in claim 1, wherein the hydraulic cylinder assembly includes at least a first piston cylinder having opposing ends of which one of the opposing ends has a connection to the frame of the truck, the hydraulic cylinder assembly further including a second piston cylinder having a first end connected to the load body, a second end thereof having connection to the other of the opposing ends of the first piston cylinder that operates directionally opposite to the second piston cylinder.

9. The hydraulic arrangement as recited in claim 1, wherein the unitary assembly is mounted at the front of the truck.

10. An hydraulic arrangement for operating a load body on a truck, the load body being connected to a frame of the truck by way of at least one articulated joint that enables tipping of the load body between a lowered transport position and a raised tipping position, said hydraulic arrangement comprising: a unitary hydraulic cylinder assembly having three parallel piston cylinders in a common plane, including two primary piston cylinders working in the same direction and a secondary piston cylinder, between the two primary piston cylinders, operating in an opposite direction, the piston cylinders being hydraulically and mechanically coupled to one another.

* * * * *